US009672677B2

(12) United States Patent
Wang et al.

(10) Patent No.: US 9,672,677 B2
(45) Date of Patent: Jun. 6, 2017

(54) METHOD AND APPARATUS FOR DETECTING MAGNETIC SIGNAL OF PAPER MONEY

(71) Applicant: GRG Banking Equipment Co., Ltd., Guangzhou, Guangdong (CN)

(72) Inventors: Qianwen Wang, Guangdong (CN); Lijun Qiao, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 14/917,241

(22) PCT Filed: Feb. 18, 2014

(86) PCT No.: PCT/CN2014/072175
§ 371 (c)(1),
(2) Date: Mar. 7, 2016

(87) PCT Pub. No.: WO2015/035750
PCT Pub. Date: Mar. 19, 2015

(65) Prior Publication Data
US 2016/0210802 A1    Jul. 21, 2016

(30) Foreign Application Priority Data

Sep. 11, 2013  (CN) .......................... 2013 1 0413805

(51) Int. Cl.
*G07D 7/04*     (2016.01)
*G06K 7/08*     (2006.01)
*G07D 7/20*     (2016.01)

(52) U.S. Cl.
CPC ............... *G07D 7/04* (2013.01); *G06K 7/087* (2013.01); *G07D 7/2008* (2013.01)

(58) Field of Classification Search
None
See application file for complete search history.

(56) References Cited

U.S. PATENT DOCUMENTS 8,083,136 B1    12/2011  Brown et al.
2003/0057141 A1  3/2003  Nomura
(Continued)

FOREIGN PATENT DOCUMENTS

CN    1414522 A    4/2003
CN    1768356 A    5/2006
(Continued)

OTHER PUBLICATIONS

Xi, Design and Implement on Multiple-Modes Banknote Counterfeit Detecting System, 2011.*
(Continued)

*Primary Examiner* — Kristy A Haupt
(74) *Attorney, Agent, or Firm* — Wolf, Greenfield & Sacks, P.C.

(57) ABSTRACT

A method and an apparatus for detecting a magnetic signal of paper money. By using detecting a magnetic track and repairing an abnormal magnetic track, the detection method solves the phenomenon of the abnormal magnetic track, and greatly improves the recognition accuracy rate and the receiving rate of a paper money recognition apparatus. The detection method comprises: S1: acquiring original data of a paper money magnetic signal; S2: performing abnormal magnetic track detection on the original data to obtain a detection result; S3: if the detection result is an abnormal magnetic track, performing step S4 and step S5, otherwise, performing step S6; S4: repairing the original data according to a preset repair rule to obtain repaired data; S5: comparing the repaired data with a preset standard value to obtain a recognition result; and S6: comparing the original data with the preset standard value to obtain a recognition result.

12 Claims, 6 Drawing Sheets

(56) References Cited

U.S. PATENT DOCUMENTS

2006/0233432 A1   10/2006  Ishida et al.
2006/0251287 A1   11/2006  Tsurumaki et al.
2013/0161391 A1    6/2013  Schmalz et al.

FOREIGN PATENT DOCUMENTS

| CN | 1774730 A | | 5/2006 | |
|---|---|---|---|---|
| CN | 101645182 A | | 2/2010 | |
| CN | 102592351 A | * | 7/2012 | ........... G07D 7/2025 |
| CN | 103440701 A | | 12/2013 | |
| JP | H097023 A | | 1/1997 | |
| JP | 2002092683 A | | 3/2002 | |
| JP | 2007034601 A | | 2/2007 | |

OTHER PUBLICATIONS

International Search Report, dated Jun. 3, 2014, from corresponding International Application No. PCT/CN2014/072175.
Chinese Office Action, dated Dec. 31, 2014, from corresponding Chinese Application No. 201310413805.4.
Xi: "Design and Implement on Multiple-Modes Banknote Conunterfeit System," 2011; Harbin Institute of Technology.
Extended European Search Report, dated Aug. 26, 2016, from related European Application No. 14844260.1.

* cited by examiner

METHOD AND APPARATUS FOR DETECTING MAGNETIC SIGNAL OF PAPER MONEY

CROSS REFERENCE TO RELATED APPLICATION

This application is the National Stage of PCT international application PCT/CN2014/072175, filed on Feb. 18, 2014, which claims priority to Chinese Patent Application No. 201310413805.4, titled "METHOD AND APPARATUS FOR DETECTING MAGNETIC SIGNAL OF PAPER MONEY", filed on Sep. 11, 2013 with the State Intellectual Property Office of the People's Republic of China, both of which applications are incorporated herein by reference in their entireties.

TECHNICAL FIELD

The present disclosure relates to the field of banknote recognition, and in particular to a method and an apparatus for detecting a magnetic signal of a banknote.

BACKGROUND

Banknotes are closely related to people's lives. The appearance of counterfeit banknotes has seriously affected the stable lives of people, and sometimes even causes serious social problems. With the progress and development of science and technology, the banknote recognition technology is continuously innovated, and methods for recognizing a banknote commonly used nowadays includes a magnetic signal detection method.

A banknote recognition apparatus includes a banknote recognition module which recognizes the banknote based on the magnetic signal detection method and includes a magnetic recognition module which is configured to detect a magnetic code of a security thread of the banknote. In the case that the usage time of the magnetic recognition module is too long, resistor-capacitor components on a headplate may easily age and become abnormal, and even be damaged, thereby causing shifts in reference values of signals of some magnetic tracks, and further leading to magnetic signals as detected to be abnormal. Such a magnetic track is simply referred to as an abnormal magnetic track.

In this case, a situation that the banknote is mistakenly recognized may occur if the banknote recognition apparatus follows an original recognition process, therefore affecting the recognition accuracy rate for the recognition module recognizing the banknote and the receiving rate for the banknote recognition apparatus receiving the banknote. Therefore, there is a need for providing a technology which can effectively deal with the phenomenon of abnormal magnetic tracks in a magnetic module and improve the robustness of a product.

SUMMARY

A method and an apparatus for detecting a magnetic signal of a banknote are provided according to the present disclosure, which can effectively solve the phenomenon of abnormal magnetic tracks by detecting magnetic tracks and repairing the abnormal magnetic tracks, thereby greatly improving the recognition accuracy rate and the receiving rate of a banknote recognition apparatus.

A method for detecting a magnetic signal of a banknote is provided according to the present disclosure, which includes:

S1: obtaining, original data of the magnetic signal of the banknote;

S2: performing, an abnormal magnetic track detection, on the original data, to obtain a detection result;

S3: going to steps S4 and S5, in the case that the detection result indicates there is any abnormal magnetic track, otherwise, going to step S6;

S4: repairing, the original data, based on a preset repair rule, to obtain repaired data;

S5: comparing, the repaired data, with a preset standard value, to obtain a recognition result; and S6: comparing, the original data, with the preset standard value, to obtain a recognition result.

Optionally, after the step S3 and before the step S6, the method further includes:

S7: recording, the abnormal magnetic track and the number of occurrences of abnormalities thereof.

Optionally, the method further includes:

S8: maintaining and upgrading, based on the abnormal magnetic track and the number of the occurrences of the abnormalities thereof.

Optionally, the step S2 includes:

a detection result of an i-th magnetic track indicates that it is an abnormal magnetic track, in the case that the following inequality is met for the i-th magnetic track: $s(i) < u(i) - avg\_threshold$; $0 \leq i \leq m$, otherwise, it is a normal magnetic track, where $s(i, j)$ is a j-th signal numerical value of the i-th magnetic track, $s(i)$ is a mean value of the i-th magnetic track, $u(i)$ is a reference value, and $avg\_threshold$ is a preset non-negative threshold parameter.

Optionally, the step S4 includes:

in the case that $s(k, j) \geq s(k)$, $t(k, j) = \min(s(k, j) + (u(k) - s(k)), 255)$, otherwise, $t(k, j) = s(k, j) * u(k)/s(k)$, where a k-th magnetic track is an abnormal magnetic track, $s(k, j)$ is a j-th signal numerical value of the k-th magnetic track, $s(k)$ is a mean value of the k-th magnetic track, $u(k)$ is a reference value, $t(k, j)$ is a repaired j-th signal numerical value of the k-th magnetic track, and a value interval of $s(k, j)$ and $t(k, j)$ is $[0, 255]$.

An apparatus for detecting a magnetic signal of a banknote is provided according to an embodiment of the present disclosure, which includes:

a magnetic signal acquisition component, configured to obtain original data of the magnetic signal of the banknote;

a data storage component connected with the magnetic signal acquisition component, configured to store data required by operation and an analysis of the apparatus;

an abnormal magnetic track detection component connected with the magnetic signal acquisition component, configured to perform an abnormal magnetic track detection on the original data to obtain a detection result;

an abnormal magnetic track repair component connected with the abnormal magnetic track detection component, configured to repair the original data based on a preset repair rule to obtain repaired data; and a magnetic signal recognition and determination component connected with the magnetic signal acquisition component and the abnormal magnetic track repair component, configured to compare the repaired data with a preset standard value to obtain a recognition result in the case that there is any abnormal magnetic track, or compare the original data with the preset standard value to obtain a recognition result in the case that magnetic tracks are normal magnetic tracks.

Optionally, the data storage component connected with the magnetic signal acquisition component is configured to store the normal magnetic tracks as reference values of corresponding magnetic tracks, and store the abnormal magnetic track and the number of occurrences of abnormalities thereof.

Optionally, the apparatus further includes:

a maintenance and upgrade component, configured to maintain and upgrade based on the abnormal magnetic track and the number of the occurrences of the abnormalities thereof.

According to the embodiments of the present disclosure, the original data of the magnetic signal of the banknote are obtained; the abnormal magnetic track detection is performed on the original data to obtain the detection result; in the case that the detection result indicates that there is any abnormal magnetic track, the original data are repaired based on the preset repair rule to obtain the repaired data, and the repaired data are compared with the preset standard value to obtain the recognition result; otherwise, the original data are compared with the preset standard value to obtain the recognition result. Based on the method and apparatus according to the present disclosure, the phenomenon of the abnormal magnetic tracks can be effectively solved by detecting the magnetic tracks and repairing the abnormal magnetic tracks, thereby greatly improving the recognition accuracy rate and the receiving rate of the banknote recognition apparatus.

DETAILED DESCRIPTION OF THE EMBODIMENTS

A method and an apparatus for detecting a magnetic signal of a banknote are provided according to embodiments of the present disclosure, which can effectively solve the phenomenon of abnormal magnetic tracks by detecting magnetic tracks and repairing the abnormal magnetic tracks, thereby greatly improving the recognition accuracy rate and the receiving rate of a banknote recognition apparatus.

It should be noted that, the method according to the embodiments of the present disclosure can be used not only for detecting the banknote, but also for detecting a value magnetic document of slice type such as a check, and the apparatus according to the embodiments of the present disclosure is not limited to being applied to an ATM machine, and can be applied to a bill handling apparatus such as a sorter. Hereinafter, banknote detection in an ATM machine is taken as an example to illustrate the method and the apparatus according to the embodiments of the present disclosure, which is not intended as a limitation of the method and the apparatus according to the present disclosure.

Figure 1:
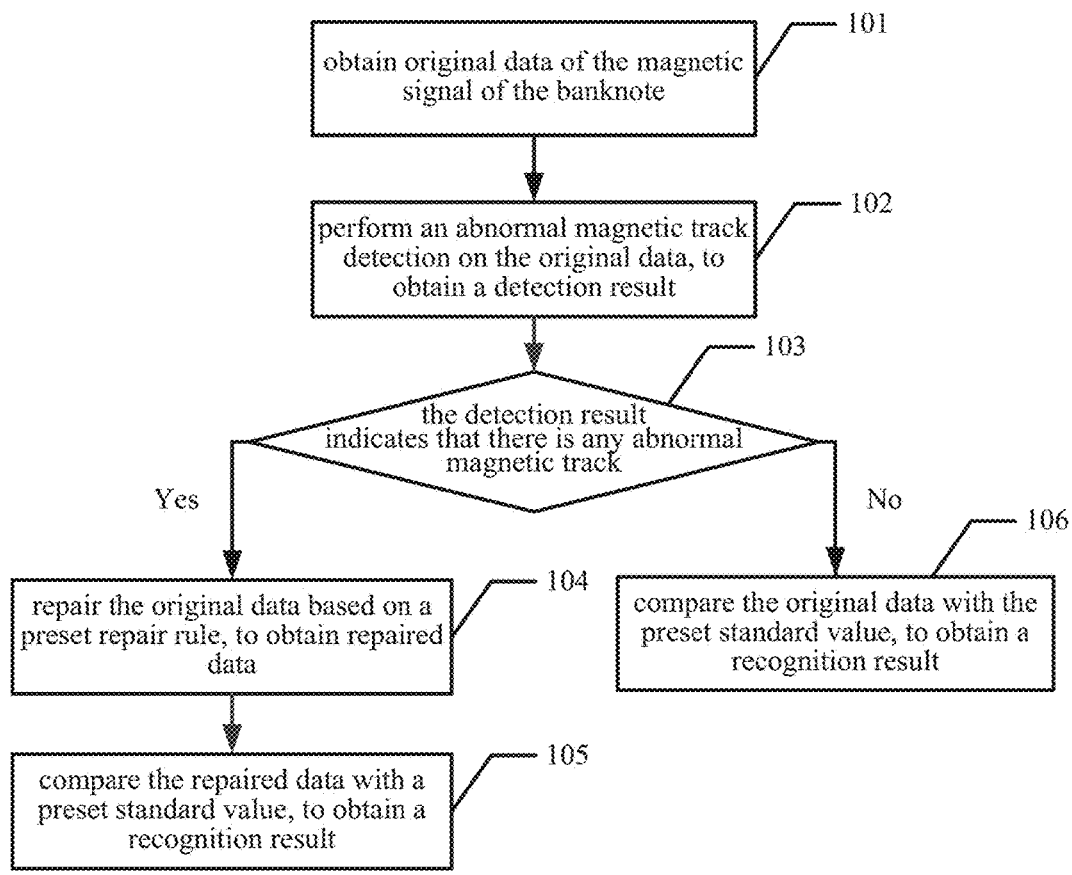
FIG. 1 is a flow chart of a method for detecting a magnetic signal of a banknote according to a first embodiment of the present disclosure.

Referring to FIG. 1, a method for detecting a magnetic signal of a banknote according to a first embodiment of the present disclosure includes the following steps 101 to 106.

In step 101, original data of the magnetic signal of the banknote are obtained.

After the banknote is put into an ATM machine, data of the magnetic signal of the banknote may be obtained when the banknote enters a scanning area of a magnetic signal sensor through a delivery channel, where the data of the magnetic signal described above are referred to as the original data of the magnetic signal of the banknote.

In step 102, an abnormal magnetic track detection is performed on the original data to obtain a detection result.

After the original data of the magnetic signal of the banknote are obtained, the abnormal magnetic track detection may be performed on the original data. The detection result can be obtained after the abnormal magnetic track detection is performed on the original data.

In step 103, the process of the method goes to step 104 and step 105 in the case that the detection result indicates there is any abnormal magnetic track, otherwise, the process of the method goes to step 106.

After the detection result is obtained, a further process may be carried out based on the detection result, which may specifically include: going to the step 104 and the step 105 in the case that the detection result indicates that there is any abnormal magnetic track, or going to the step 106 in the case that the detection result indicates that magnetic tracks are normal magnetic tracks.

In step 104, the original data are repaired based on a preset repair rule to obtain repaired data.

In the case that the detection result indicates there is any abnormal magnetic track, the original data may be repaired based on the preset repair rule to obtain the repaired data. The repair rule described above may be adjusted for different types of banknotes, checks and so on, which is limited herein.

In step 105, the repaired data are compared with a preset standard value to obtain a recognition result.

After the repaired data are obtained, the repaired data may be compared with the preset standard value to obtain the recognition result. It should be noted that the recognition result described above is a final recognition result of a banknote recognition.

In step 106, the original data are compared with the preset standard value to obtain a recognition result.

In the case that the detection result indicates that the magnetic tracks are normal magnetic tracks, the original data may be compared with the preset standard value to obtain the recognition result. It should be noted that the recognition result described above is a final recognition result of the banknote recognition.

According to the embodiment of the present disclosure, the original data of the magnetic signal of the banknote are obtained; the abnormal magnetic track detection is performed on the original data to obtain the detection result; in the case that the detection result indicates that there is any abnormal magnetic track, the original data are repaired based on the preset repair rule to obtain the repaired data, and the repaired data are compared with the preset standard value to obtain the recognition result; otherwise, the original data are compared with the preset standard value to obtain the recognition result. Based on the method and apparatus according to the embodiments of the present disclosure, the phenomenon of the abnormal magnetic tracks can be effectively solved by detecting the magnetic tracks and repairing the abnormal magnetic tracks, thereby greatly improving the recognition accuracy rate and the receiving rate of the banknote recognition apparatus.

Figure 2:
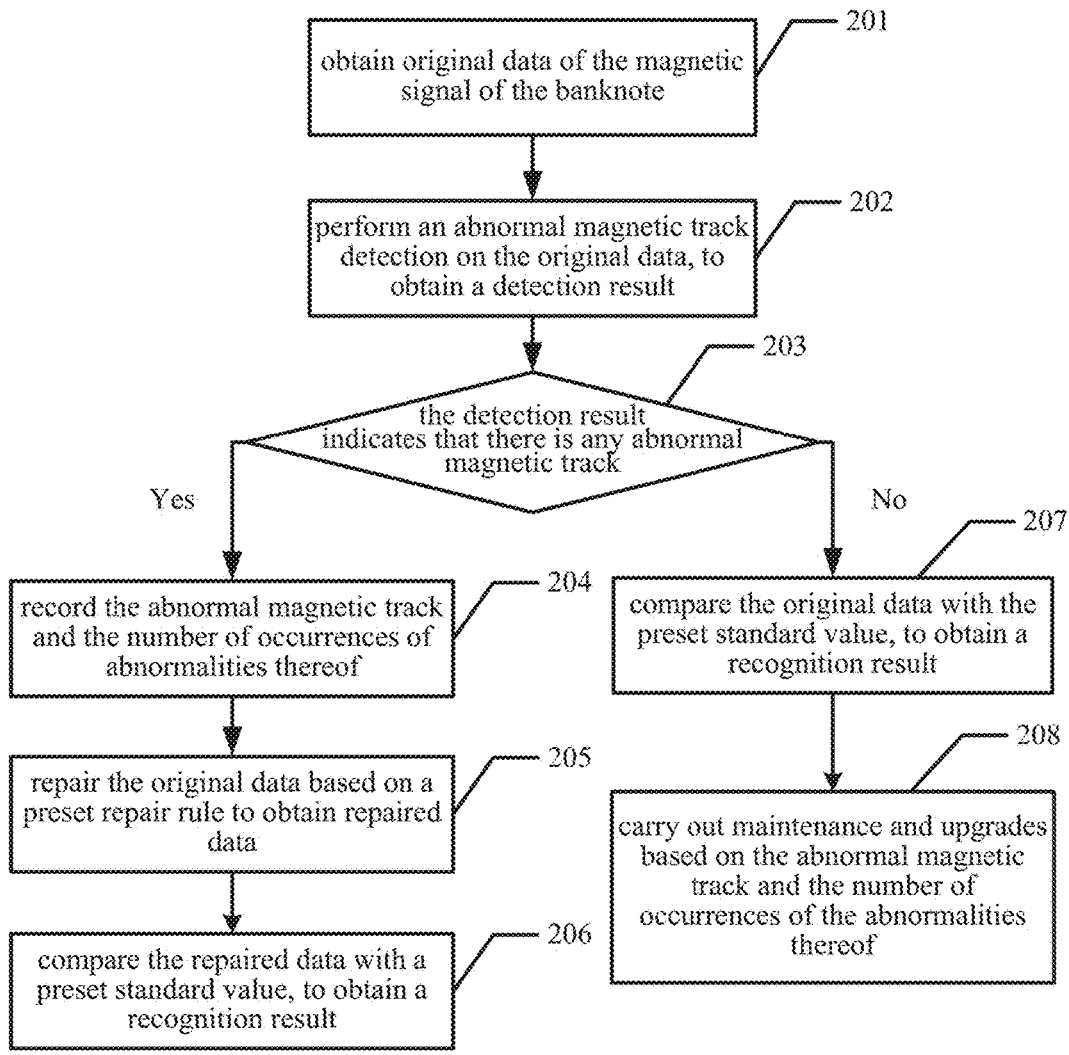
FIG. 2 is a flow chart of a method for detecting a magnetic signal of a banknote according to a second embodiment of the present disclosure.
Figure 3:
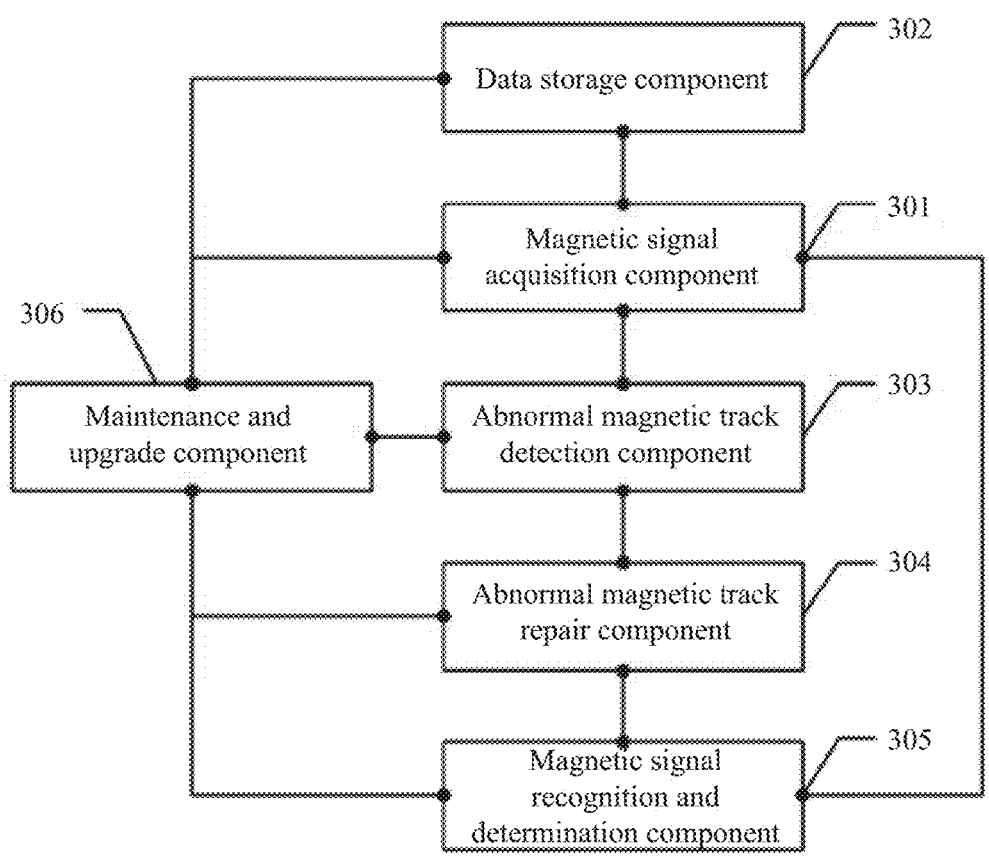
FIG. 3 is a schematic structural diagram of an apparatus for detecting a magnetic signal of a banknote according to an embodiment of the present disclosure.

The method for detecting the magnetic signal of the banknote according to the first embodiment of the present disclosure is briefly described above. A method for detecting a magnetic signal of a banknote according to a second embodiment of the present disclosure is described in detail hereinafter. Referring to FIG. 2, the method for detecting the magnetic signal of the banknote according to the second embodiment of the present disclosure includes the following steps 201 to 208.

In step 201, original data of the magnetic signal of the banknote are obtained.

After the banknote is put into an ATM machine, data of the magnetic signal of the banknote may be obtained when the banknote enters a scanning area of a magnetic signal sensor through a delivery channel, where the data of the magnetic signal described above are referred to as the original data of the magnetic signal of the banknote.

In step 202, an abnormal magnetic track detection is performed on the original data to obtain a detection result.

After the original data of the magnetic signal of the banknote are obtained, the abnormal magnetic track detection may be performed on the original data. The detection result can be obtained after the abnormal magnetic track detection is performed on the original data.

The process of performing the abnormal magnetic track detection on the original data described above may specifically include:

a detection result of an i-th magnetic track indicates that it is an abnormal magnetic track in the case that the following inequality is met for the i-th magnetic track: $s(i) < u(i) - avg\_threshold$; $0 \le i \le m$, otherwise, it is a normal magnetic track, where $s(i, j)$ is a j-th signal numerical value of the i-th magnetic track, $s(i)$ is a mean value of the i-th magnetic track, $u(i)$ is a reference value, and avg_threshold is a preset non-negative threshold parameter.

In step 203, the process of the method goes to steps 204 to 206 in the case that the detection result indicates that there is any abnormal magnetic track, otherwise, the process of the method goes to step 207.

After the detection result is obtained, a further process may be carried out based on the detection result, which may specifically include: going to the steps 204 to 206 in the case that the detection result indicates that there is any abnormal magnetic track, or going to the step 207 in the case that the detection result indicates that magnetic tracks are normal magnetic tracks.

In step 204, abnormal magnetic tracks and the number of occurrences of abnormalities thereof are recorded.

In the case that the detection result indicates that there is any abnormal magnetic track, the abnormal magnetic tracks and the number of occurrences of the abnormalities thereof may be recorded. The performance of an apparatus for detecting a magnetic signal of a banknote may be evaluated based on the abnormal magnetic tracks and the number of occurrences of the abnormalities thereof described above, and the apparatus for detecting the magnetic signal of the banknote may be maintained and upgraded based on a set of a large amount of statistical data.

For example, the abnormal magnetic tracks and the number of occurrences of the abnormalities thereof may be processed to obtain an early warning signal, the early warning signal described above and original data of every magnetic signal are stored, and targeted maintenance and upgrades may be carried out by fetching and analyzing stored data when maintaining the apparatus for detecting the magnetic signal of the banknote. The process of processing the abnormal magnetic track and the number of occurrences of the abnormalities thereof to obtain an early warning signal described above may include: respectively accumulating the number of occurrences of the abnormalities for each of the abnormal magnetic tracks, and calculating a mean value of reference values for each of the abnormal magnetic tracks through rolling computations as the early warning signal. Specifically, it is assumed that the number of occurrences of abnormalities for a k-th magnetic track is $f(k)$ at a current time, a mean value of reference values which is stored at a previous time is $v1$, and a reference value calculated at the current time is $v2$, then a reference value $v(k)$ of the abnormal magnetic track updated through rolling updates is $v(k) = ((f(k)-1)*v1+v2)/k$.

It should be noted that the step 204 is not limited to being performed after the step 203, and it may be performed, before or after, any step performed after the step 203 and before the step 207, which is not limited herein.

In step 205, the original data are repaired based on a preset repair rule to obtain repaired data.

In the case that the detection result indicates that there is any abnormal magnetic track, the original data may be repaired based on the preset repair rule to obtain the repaired data. The repair rule described above may be adjusted for different types of banknotes, checks and so on, which is limited herein.

The process of repairing the original data based on the preset repair rule described above may specifically include:

in the case that $s(k, j) \ge s(k)$, $t(k, j) = \min(s(k, j)+(u(k)-s(k)), 255)$, otherwise, $t(k, j) = s(k, j)*u(k)/s(k)$, where a k-th magnetic track is an abnormal magnetic track, $s(k, j)$ is a j-th signal numerical value of the k-th magnetic track, $s(k)$ is a mean value of the k-th magnetic track, $u(k)$ is a reference value thereof, $t(k, j)$ is a repaired j-th signal numerical value of the k-th magnetic track, and a value interval of $s(k, j)$ and $t(k, j)$ is $[0, 255]$.

In step 206, the repaired data are compared with a preset standard value to obtain a recognition result.

After the repaired data are obtained, the repaired data may be compared with the preset standard value to obtain the recognition result. It should be noted that the recognition result described above is a final recognition result of a banknote recognition.

In step 207, the original data are compared with the preset standard value to obtain a recognition result.

In the case that the detection result indicates that the magnetic tracks are normal magnetic tracks, the original data may be compared with the preset standard value to obtain the recognition result. It should be noted that the recognition result described above is the final recognition result of the banknote recognition. The preset standard value described above is a stable standard eigenvalue obtained by training data information of normal magnetic tracks of a large number of real banknotes.

In step 208, maintenance and upgrades may be carried out based on the abnormal magnetic tracks and the number of occurrences of the abnormalities thereof.

After the abnormal magnetic tracks and the number of occurrences of the abnormalities thereof are recorded, the targeted maintenance and upgrades may be carried out on the apparatus for detecting the magnetic signal of the banknote based on the abnormal magnetic tracks and the number of occurrences of the abnormalities thereof. It should be noted that the step 208 is not limited to being performed after the step 207, and it may be performed before or after any step in the embodiment of the present disclosure, which is not limited herein.

According to the embodiment of the present disclosure, the original data of the magnetic signal of the banknote are obtained; the abnormal magnetic track detection is performed on the original data to obtain the detection result; in the case that the detection result indicates that there is any abnormal magnetic track, the abnormal magnetic tracks and the number of occurrences of the abnormalities thereof are recorded, and the original data are repaired based on the preset repair rule to obtain the repaired data; the repaired data are compared with the preset standard value to obtain the recognition result; otherwise, the original data are compared with the preset standard value to obtain the recognition result, and finally, the maintenance and upgrades may be carried out based on the abnormal magnetic tracks and the number of occurrences of the abnormalities thereof. Based on the method and apparatus according to the embodiments of the present disclosure, the phenomenon of the abnormal magnetic tracks can be effectively solved by detecting the magnetic tracks and repairing the abnormal magnetic tracks, thereby greatly improving the recognition accuracy rate and the receiving rate of the banknote recognition apparatus. In addition, the abnormal magnetic tracks and the number of occurrences of the abnormalities thereof can be recorded; and the maintenance and upgrades may be carried out based on the abnormal magnetic tracks and the number of occurrences of the abnormalities thereof, thereby further improving the robustness of the apparatus for detecting the magnetic signal of the banknote.

The method for detecting the magnetic signal of the banknote according to the second embodiment of the present disclosure, especially the process of performing an abnormal magnetic track detection on the original data and repairing the original data based on the preset repair rule, is briefly described above. An apparatus for detecting a magnetic signal of a banknote according to an embodiment of the present disclosure is described hereinafter. Referring FIG. 3 to FIG. 6, the apparatus for detecting the magnetic signal of the banknote according to an embodiment of the present disclosure includes:

a magnetic signal acquisition component 301, configured to obtain original data of the magnetic signal of the banknote;

a data storage component 302 connected with the magnetic signal acquisition component 301, configured to store data required by operation and an analysis of the apparatus;

an abnormal magnetic track detection component 303 connected with the magnetic signal acquisition component 301, configured to perform an abnormal magnetic track detection on the original data to obtain a detection result;

an abnormal magnetic track repair component 304 connected with the abnormal magnetic track detection component 303, configured to repair the original data based on a preset repair rule to obtain repaired data; and a magnetic signal recognition and determination component 305 connected with the magnetic signal acquisition component 302 and the abnormal magnetic track repair component 304, configured to compare the repaired data with a preset standard value to obtain a recognition result in the case that there is any abnormal magnetic track, or compare the original data with the preset standard value, to obtain a recognition result in the case that magnetic tracks are normal magnetic tracks.

The apparatus according to an embodiment of the present disclosure may further includes:

a maintenance and upgrade component 306, configured to maintain and upgrade based on abnormal magnetic tracks and the number of occurrences of abnormalities thereof.

After the banknote is put into an ATM machine, data of the magnetic signal of the banknote may be obtained by the magnetic signal acquisition component 301 when the banknote enters a scanning area of a magnetic signal sensor through a delivery channel, where the data of the magnetic signal described above are referred to as the original data of the magnetic signal of the banknote. After the original data of the magnetic signal of the banknote are obtained by the magnetic signal acquisition component 301, the abnormal magnetic track detection may be performed on the original data by the abnormal magnetic track detection component 303, and then the detection result are obtained.

The process of performing the abnormal magnetic track detection on the original data by the abnormal magnetic track detection component 303 described above may specifically include:

a detection result of an i-th magnetic track indicates that it is an abnormal magnetic track in the case that the following inequality is met for the i-th magnetic track: $s(i) < u(i) - avg\_threshold$; $0 \le i \le m$, otherwise, it is a normal magnetic track, where $s(i, j)$ is a j-th signal numerical value of the i-th magnetic track, $s(i)$ is a mean value of the i-th magnetic track, $u(i)$ is a reference value, and avg_threshold is a preset non-negative threshold parameter.

Figure 4:
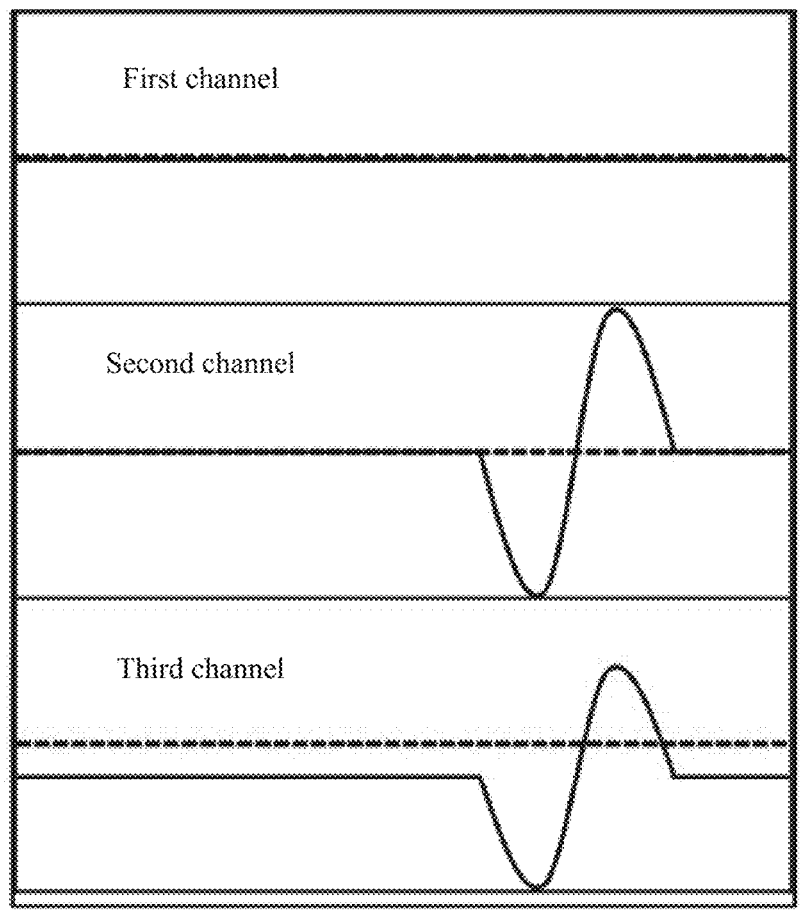
FIG. 4 is a schematic diagram of a third channel of a magnetic signal of a banknote being abnormal according to an embodiment of the present disclosure.
Figure 5:
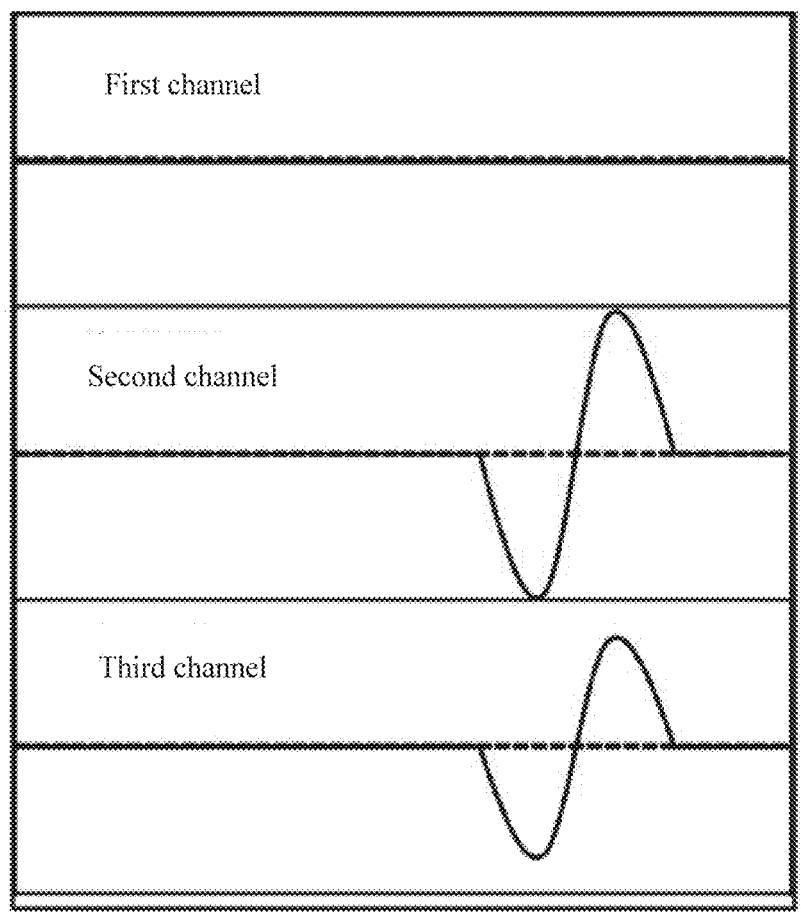
FIG. 5 is a schematic diagram of a third channel of a magnetic signal of a banknote being normal according to an embodiment of the present disclosure.

Referring to FIG. 4 and FIG. 5, FIG. 4 illustrates a situation that the third channel of the magnetic signal of the banknote is abnormal, and FIG. 5 illustrates a situation that the third channel of the magnetic signal of the banknote is normal. In the case that the detection result indicates there is any abnormal magnetic track, the abnormal magnetic tracks and the number of occurrences of the abnormalities thereof may be recorded by the data storage component 302. The performance of the apparatus for detecting the magnetic signal of the banknote may be evaluated based on the abnormal magnetic tracks and the number of occurrences of the abnormalities thereof described above, and the apparatus for detecting the magnetic signal of the banknote may be maintained and upgraded based on a set of a large amount of statistical data.

For example, the abnormal magnetic tracks and the number of occurrences of the abnormalities thereof may be processed to obtain an early warning signal, the early warning signal described above and original data of every magnetic signal are stored, and targeted maintenance and upgrades may be carried out by fetching and analyzing stored data when maintaining the apparatus for detecting the magnetic signal of the banknote by the maintenance and upgrade component 306. The process of processing the abnormal magnetic tracks and the number of occurrences of the abnormalities thereof to obtain an early warning signal described above may include: respectively accumulating the number of occurrences of the abnormalities for each of the abnormal magnetic tracks, and calculating a mean value of reference values for each of the abnormal magnetic tracks through rolling computations as the early warning signal. Specifically, it is assumed that the number of occurrences of abnormalities for a k-th magnetic track is f (k) at a current time, a mean value of reference values which is stored at a previous time is v1, and a reference value calculated at the current time is v2, then a reference value of the abnormal magnetic track updated through rolling updates is v(k)=((f(k)−1)*v1+v2)/k.

Figure 6:
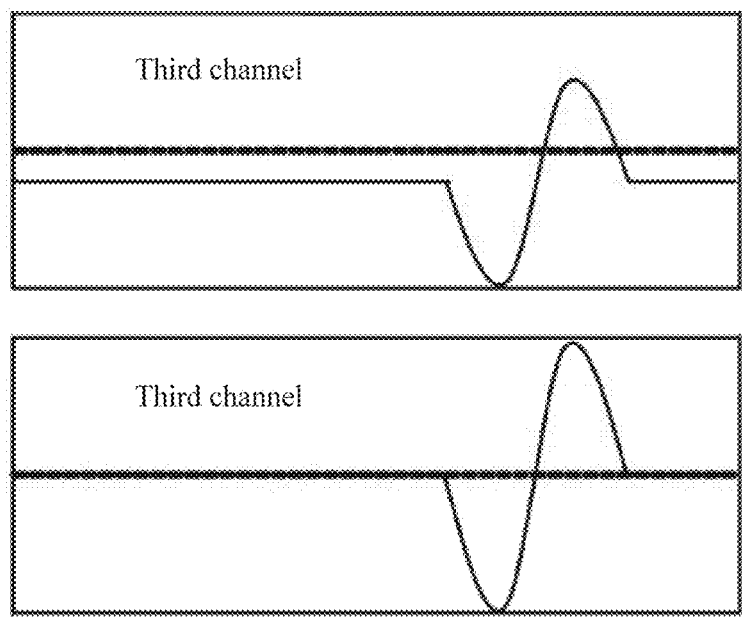
FIG. 6 is a schematic diagram of a third channel of a magnetic signal of a banknote before and after being repaired according to an embodiment of the present disclosure.

In addition, the original data may be repaired by the abnormal magnetic track repair component 304 based on the preset repair rule to obtain the repaired data. Reference is made to FIG. 6, which is a comparison of the third channel of the magnetic signal of the banknote before and after being repaired. The repair rule described above may be adjusted for different types of banknotes, checks and so on, which is limited herein.

The process of repairing the original data by the abnormal magnetic track repair component 304 based on the preset repair rule described above may specifically include:

in the case that s(k, j)≥s(k), t(k, j)=min(s(k, j)+(u(k)−s(k)),255), otherwise, t(k, j)=s(k, j)*u(k)/s(k), where a k-th magnetic track is an abnormal magnetic track, s(k, j) is a j-th signal numerical value of the k-th magnetic track, s(k) is a mean value of the k-th magnetic track, u(k) is a reference value, t(k, j) is a repaired j-th signal numerical value of the k-th magnetic track, and a value interval of s(k, j) and t(k, j) is [0,255].

In the case that the detection result indicates that there is any abnormal magnetic track, the repaired data are compared with the preset standard value by the magnetic signal recognition and determination component 305 to obtain the recognition result; and in the case that the detection result indicates that the magnetic tracks are normal magnetic tracks, the original data are compared with the preset standard value by the magnetic signal recognition and determination component 305 to obtain the recognition result, where the recognition result described above is a final recognition result of the banknote recognition.

According to the embodiments of the present disclosure, the original data of the magnetic signal of the banknote are first obtained by the magnetic signal acquisition component 301; then the abnormal magnetic track detection is performed on the original data by the abnormal magnetic track detection component 303 to obtain the detection result; in the case that the detection result indicates that there is any abnormal magnetic track, the abnormal magnetic tracks and the number of occurrences of the abnormalities thereof are recorded by the data storage component 302, and the original data are repaired by the abnormal magnetic track repair component 304 based on the preset repair rule to obtain the repaired data; the repaired data are compared with the preset standard value by the magnetic signal recognition and determination component 305 to obtain the recognition result; otherwise, the original data are compared with the preset standard value by the magnetic signal recognition and determination component 305 to obtain the recognition result; and finally, the maintenance and upgrades may be carried out by the maintenance and upgrade component 306 based on the abnormal magnetic tracks and the number of occurrences of the abnormalities thereof. Based on the method and apparatus according to the embodiments of the present disclosure, the phenomenon of the abnormal magnetic tracks can be effectively solved by detecting the magnetic tracks and repairing the abnormal magnetic tracks, thereby greatly improving the recognition accuracy rate and the receiving rate of the banknote recognition apparatus. In addition, the abnormal magnetic tracks and the number of occurrences of the abnormalities thereof can be recorded, and the maintenance and upgrades may be carried out based on the abnormal magnetic tracks and the number of occurrences of the abnormalities thereof, thereby further improving the robustness of the apparatus for detecting the magnetic signal of the banknote.

Those skilled in the art may understand that all or some of the steps in the method according to the above embodiments may be performed by a program instructing relevant hardware, the program may be stored in a computer readable storage medium, and the storage medium described above may be a read-only memory, a magnetic disk, an optical disk, and so on.

In the above, the method and the apparatus for detecting the magnetic signal of the banknote according to the present disclosure are described in detail. Changes can be made to specific implementations and application scope by those skilled in the art according the idea of the embodiments of the present disclosure. In conclusion, the contents of the present disclosure are not to be interpreted as limitations to the present disclosure.

The invention claimed is:

1. A method for detecting a magnetic signal of a banknote, comprising:
   S1: obtaining original data of the magnetic signal of the banknote;
   S2: performing an abnormal magnetic track detection on the original data, to obtain a detection result, wherein a magnetic track having a shift in a reference value of signal numerical values is determined to be abnormal;
   S3: going to step S4 and step S5 in the case of the detection of the abnormal magnetic track, otherwise, going to step S6;
   S4: repairing the original data based on a preset repair rule, to obtain repaired data;
   S5: comparing the repaired data with a preset standard value, to obtain a recognition result; and
   S6: comparing the original data with the preset standard value, to obtain a recognition result.

2. The method for detecting the magnetic signal of the banknote according to claim 1, wherein after the step S3 and before the step S6, the method further comprises:
   S7: recording abnormal magnetic tracks and the number of occurrences of abnormalities thereof.

3. The method for detecting the magnetic signal of the banknote according to claim 2, further comprising:
   S8: maintaining and upgrading, based on the abnormal magnetic tracks and the number of the occurrences of the abnormalities thereof.

4. The method for detecting the magnetic signal of the banknote according to claim 3, wherein the step S2 comprises:
   a detection result of an i-th magnetic track indicates that it is an abnormal magnetic track in the case that the following inequality is met for the i-th magnetic track: s(i)<u(i)−avg_threshold; 0≤i≤m , otherwise, it is a normal magnetic track, wherein
   s(i, j) is a j-th signal numerical value of the i-th magnetic track, s(i) is a mean value of the i-th magnetic track, u(i) is a reference value, and avg_threshold is a preset non-negative threshold parameter.

5. The method for detecting the magnetic signal of the banknote according to claim 3, wherein the step S4 comprises:

in the case that $s(k, j) \geq s(k)$, $t(k, j)=\min(s(k, j)+(u(k)-s(k)), 255)$, otherwise, $t(k, j)=s(k, j)*u(k)/s(k)$, wherein a k-th magnetic track is an abnormal magnetic track, $s(k, j)$ is a j-th signal numerical value of the k-th magnetic track, $s(k)$ is a mean value of the k-th magnetic track, $u(k)$ is a reference value, $t(k, j)$ is a repaired j-th signal numerical value of the k-th magnetic track, and a value interval of $s(k, j)$ and $t(k, j)$ is $[0,255]$.

6. The method for detecting the magnetic signal of the banknote according to claim 2, wherein the step S2 comprises:

a detection result of an i-th magnetic track indicates that it is an abnormal magnetic track in the case that the following inequality is met for the i-th magnetic track: $s(i)<u(i)-\text{avg\_threshold}$; $0 \leq i \leq m$, otherwise, it is a normal magnetic track, wherein $s(i, j)$ is a j-th signal numerical value of the i-th magnetic track, $s(i)$ is a mean value of the i-th magnetic track, $u(i)$ is a reference value, and avg_threshold is a preset non-negative threshold parameter.

7. The method for detecting the magnetic signal of the banknote according to claim 2, wherein the step S4 comprises:

in the case that $s(k, j) \geq s(k)$, $t(k, j)=\min(s(k, j)+(u(k)-s(k)), 255)$, otherwise, $t(k, j)=s(k, j)*u(k)/s(k)$, wherein a k-th magnetic track is an abnormal magnetic track, $s(k, j)$ is a j-th signal numerical value of the k-th magnetic track, $s(k)$ is a mean value of the k-th magnetic track, $u(k)$ is a reference value, $t(k, j)$ is a repaired j-th signal numerical value of the k-th magnetic track, and a value interval of $s(k, j)$ and $t(k, j)$ is $[0,255]$.

8. The method for detecting the magnetic signal of the banknote according to claim 1, wherein the step S2 comprises:

a detection result of an i-th magnetic track indicates that it is an abnormal magnetic track in the case that the following inequality is met for the i-th magnetic track: $s(i)<u(i)-\text{avg\_threshold}$; $0 \leq i \leq m$, otherwise, it is a normal magnetic track, wherein $s(i, j)$ is a j-th signal numerical value of the i-th magnetic track, $s(i)$ is a mean value of the i-th magnetic track, $u(i)$ is a reference value, and avg_threshold is a preset non-negative threshold parameter.

9. The method for detecting the magnetic signal of the banknote according to claim 1, wherein the step S4 comprises:

in the case that $s(k, j) \geq s(k)$, $t(k, j)=\min(s(k, j)+(u(k)-s(k)), 255)$, otherwise, $t(k, j)=s(k, j)*u(k)/s(k)$, wherein a k-th magnetic track is an abnormal magnetic track, $s(k, j)$ is a j-th signal numerical value of the k-th magnetic track, $s(k)$ is a mean value of the k-th magnetic track, $u(k)$ is a reference value, $t(k, j)$ is a repaired j-th signal numerical value of the k-th magnetic track, and a value interval of $s(k, j)$ and $t(k, j)$ is $[0,255]$.

10. An apparatus for detecting a magnetic signal of a banknote, comprising:

a magnetic signal acquisition component, configured to obtain original data of the magnetic signal of the banknote;

a data storage component connected with the magnetic signal acquisition component, configured to store data required by operation and an analysis of the apparatus;

an abnormal magnetic track detection component connected with the magnetic signal acquisition component, configured to perform an abnormal magnetic track detection on the original data to obtain a detection result, wherein a magnetic track having a shift in a reference value of signal numerical values is determined to be abnormal;

an abnormal magnetic track repair component connected with the abnormal magnetic track detection component, configured to repair the original data based on a preset repair rule to obtain repaired data; and a magnetic signal recognition and determination component connected with the magnetic signal acquisition component and the abnormal magnetic track repair component, configured to compare the repaired data with a preset standard value to obtain a recognition result in the case of the detection of the abnormal magnetic track, or compare the original data with the preset standard value to obtain a recognition result in the case that magnetic tracks are normal magnetic tracks.

11. The apparatus for detecting the magnetic signal of the banknote according to claim 10, wherein the data storage component connected with the magnetic signal acquisition component is configured to store the normal magnetic tracks as reference values of corresponding magnetic tracks, and store abnormal magnetic tracks and the number of occurrences of abnormalities thereof.

12. The apparatus for detecting the magnetic signal of the banknote according to claim 10, further comprising:

a maintenance and upgrade component, configured to maintain and upgrade based on the abnormal magnetic tracks and the number of the occurrences of the abnormalities thereof.

* * * * *